F. FISCHER.
UNIVERSAL JOINT.
APPLICATION FILED JAN. 10, 1921.
1,397,951.
Patented Nov. 22, 1921.
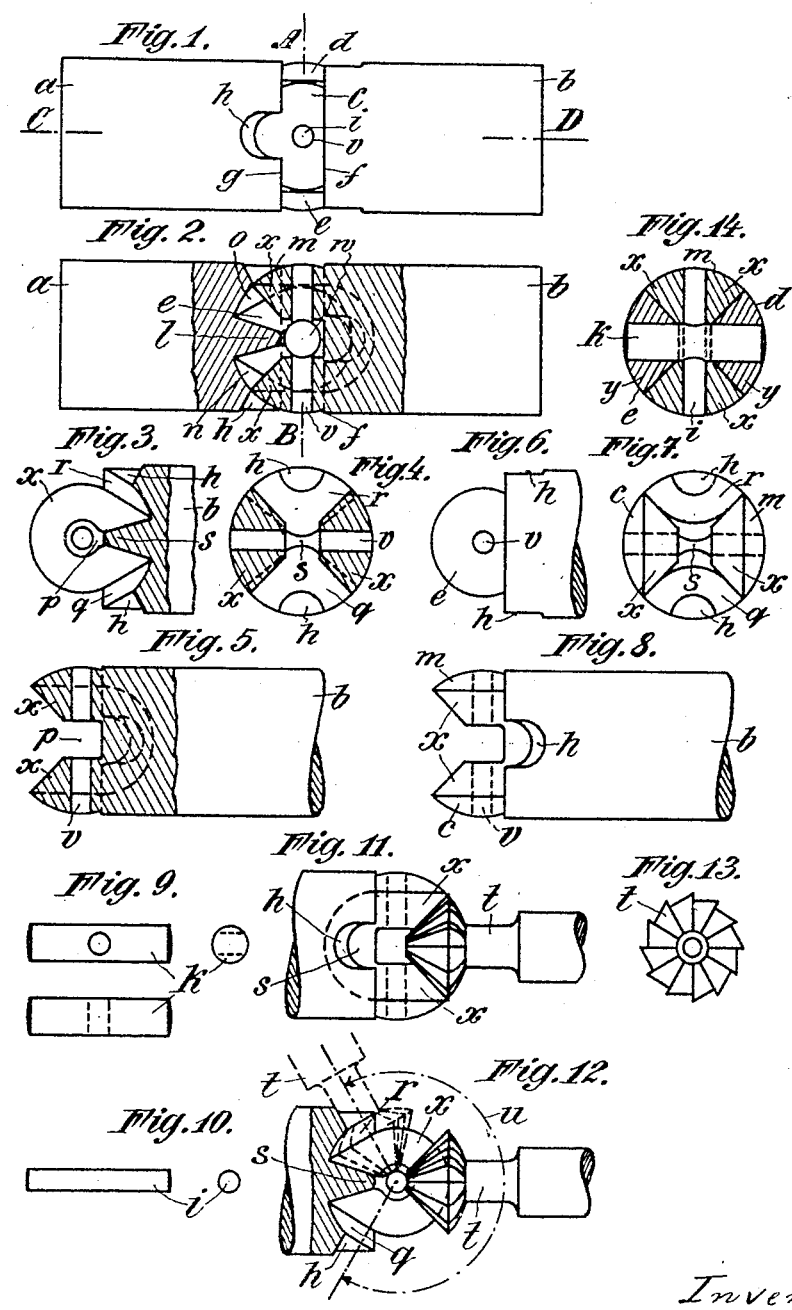
Inventor:
Ferdinand Fischer
By Lawrence Langner,
Attorney

United States Patent Office.

FERDINAND FISCHER, OF BERLIN, GERMANY.

UNIVERSAL JOINT.

1,397,951.   Specification of Letters Patent.   Patented Nov. 22, 1921.

Application filed January 10, 1921. Serial No. 436,186.

*To all whom it may concern:*

Be it known that I, FERDINAND FISCHER, a citizen of the German Republic, residing at Berlin, Germany, have invented certain new and useful Improvements in Universal Joints, of which the following is a specification.

My invention relates to a novel type of universal joint. Joints of this kind are used as coupling-elements for shafts disposed angularly with reference to each other, but more particularly in such cases, where the coupling angle is subject to alterations. The majority of universal joints known are substantially composed of three parts, that is to say, two shafts and an intermediary member serving to transmit the power from one shaft to the other. An essential advance in the art has been made by the discovery that the intermediary member may be entirely omitted as soon as a reliable engagement and a shockless power transmission can be secured by giving to the shaft ends the suitable shape required.

The most ideal geometrical form suitable for the sphere of engagement thus created will, no doubt be attained on the shaft ends being given the shape of rectangular, oppositely disposed truncated cones, the axes of which are located at right angles to the respective shaft axes.

However, the theoretical solution of this problem is as yet far from a practical realization and this for the reason that a construction based on the aforesaid considerations alone would result in the production of a universal joint which—relatively to its dimensions — would afford far too small power transmitting capacity. This defect is now entirely remedied by the joint constructed on the lines of my invention.

Taking advantage of the fact that is common practice the angle of deflection of the joints employed never exceeds 25 to 30°, it follows that the oppositely disposed truncated cones are not obliged to operate for the entire breadth of their convex surfaces so that the inoperative sections of said surfaces may each be given the shape of a connecting rib as a means of reinforcement and to secure a greater strength for the whole joint.

In addition, with the view of obtaining a reliable engagement of parts and an improved means of guiding the parts of the joint relatively to each other, those sections of the exterior of each frustum adapted to enter into interengagement with the counter frustum, are given a spherical shape. And in accordance herewith the depressions serving to accommodate the said spherical portions, are suitably cup shaped. By these means the reliable movement of the parts of the joint relatively to each other is, as will be observed, still further secured. As a result, the joint obtains a compact appearance with no protruding parts, so that it will not be necessary to surround the joint with a special protective casing—a feature of high importance where considered from the point of view of "safety first."

For the purpose of interconnecting the two parts of the joint and in order to secure a reliable interengagement thereof, the parts of the joint are interconnected by means of two pins or bolts, of different diameter or thickness and mutually traversing each other.

These pins or bolts are disposed within boreholes arranged alongside of the axes of the two frustums. The smaller of the two pins or bolts may, if thought expedient, be slightly riveted at its ends, whereby the interengagement of the parts of the joint is still further increased.

Besides, it will be readily noted that this proposed form of joint structure may be manufactured at an extraordinarily cheap cost.

The external spherical sections of the counter frustums are produced by a simple turning operation and that preferably by means of a so-called spherical cutter. Both the external surfaces of the frustums as also the surfaces serving to confine the ribs and the hollow spherical guide surfaces may be produced in the course of a single working operation by means of a rectangular conical cutter, provided the latter be moved in a planet motion about the axis of each of the frustums and at the same time be caused to penetrate the material of the parts of the joint. The remaining operations required for the manufacture of the joint, such as the preceding slotting, boring and milling of the spindle passages, are carried out in the customary manner.

In the drawing affixed to this specification and forming part thereof a joint embodying my invention is illustrated by way of example. In this drawing—

Figure 1 is an elevation of the joint,

Fig. 2 is a section on line C—D in Fig. 1 with the joint-pins or bolts removed from the bore-holes, Figs. 3, 4 and 5 are three different sectional views of one part of the joint, Figs. 6, 7 and 8 are pertinent elevations thereto, Fig. 9 discloses the larger of the two pins or bolts in three separate views, Fig. 10 represents a plan and side view of the smaller bolt $i$.

Figs. 11 and 12 illustrate the method of manufacture of the joint in accordance with my invention, Fig. 13 is an elevation of the conical cutter seen in the axial direction, and Fig. 14 is a cross section of the joint on line A—B in Fig. 1.

Referring to these drawings, the joint shown in Fig. 1 comprises two shaft spindles $a$ and $b$, while $c$ denotes a spherically shaped base of a double cone $x$ integral with the spindle $b$, the opposite base section, and which is likewise spherical in shape, being indicated by $m$. $d$ and $c$ denote the two spherical base sections of the set of cones $y$ appertaining to the spindle $a$.

By $f$ and $g$ are denoted the front ends of the two shaft spindles, and which ends for their part constitute broken annular surfaces. The milled portions $h$ have no bearing on the action of the joint and only serve as a means to afford room for the cutter arbor during the manufacture of the several parts of the joint. Within an axial bore $v$ formed in cone $c$ there is disposed a joint pin or connecting bolt $i$.

As disclosed in Fig. 2, the two cones appertaining to each set are not quite complete, but are rather interconnected at the part facing the respective shaft and which is not required for the purpose of engaging the counter shaft, by intervention of a rib $l$. The peculiar shape given to this rib is disclosed to the left at shaft $a$, whereas the rib $s$ (Figs. 3 and 4) disposed at an angle of 90° thereto and appertaining to shaft $b$ is slotted longitudinally for its whole extent and, without in any way protruding, passes over into the section of shaft $b$. The rib $l$ is adjoined at either side by hollow cylindrical guide faces $n$ and $o$ within which the bases $m$ and $c$ of the double cone $x$ are adapted to glide or move. Within the bore $w$ of this cone is located a connecting bolt $k$. The two sets of cones $x$ and $y$ as also the connecting bolts $i$ and $k$ are more particularly shown in Fig. 14.

Referring now to Figs. 3 to 8 it will be seen, that the counter cones are truncated at $p$ by means of a slot disposed transversely to their axes. The hollow spherical guide faces of shaft $b$ are shown at $q$ and $r$, while $s$ denotes the connecting rib belonging to cone $x$.

The larger of the two connecting bolts, i. e., $k$ (Fig. 9) serves to accommodate the smaller connecting bolt, i. e., $i$, within a bore hole arranged for this purpose, and this when the joint has been duly fitted in place.

The method of manufacture as disclosed in Figs. 11 and 12 shows how by its means the two conical outer surfaces of a double cone $x$, as also the connecting rib $s$ and the hollow spherical guide surfaces $r$ and $q$ may be shaped out of the material by aid of a single milling operation. The milling cutter $t$ carries out a planet motion about the axis of the frustums for the extent of the angle $u$ until the confines are reached formed by the milled portions $h$ arranged for this purpose in advance.

Having now particularly described and ascertained the nature of my said invention, what I claim is:—

1. A universal joint comprising two joint members having each a body portion carrying two oppositely arranged truncated cones having a common axis passing through and normal with the axis of the body portion, and a rib connecting the two truncated cones, the truncated cones of one joint member peripherally contacting with the truncated cones of the other joint member, and means for connecting the two joint members for universal movement and for maintaining the peripheral contact thereof.

2. A universeal joint comprising two joint members having each a body portion carrying two oppositely arranged truncated cones having a common axis passing through and normal with the axis of the body portion and recessed spaces intermediate the said truncated cones, the truncated cones of one joint member peripherally contacting with the truncated cones of the other joint member and entering the recessed spaces thereof and means for connecting the two joint members for universal movement and for maintaining the peripheral contact thereof.

3. A universal joint comprising two joint members having each a body portion carrying two oppositely arranged truncated cones having a common axis passing through and normal with the axis of the body portion, a rib connecting the two truncated cones and recessed spaces intermediate the said truncated cones, the truncated cones of one joint member peripherally contacting with the truncated cones of the other joint member and entering the recessed spaces thereof and means for connecting the two joint members for universal movement and for maintaining the peripheral contact thereof.

4. A universal joint comprising two joint members having each a body portion, carrying two oppositely arranged truncated cones having a common axis passing through and normal with the axis of the body portion and a spherical base, a cone-connecting rib and spherically recessed spaces intermediate the said truncated cones, the truncated cones of one joint member peripherally contacting with the truncated cones of the other joint member and entering with their base portions into the recessed spaces thereof and means for connecting the two joint members for universal movement and for maintaining the peripheral contact thereof.

5. A universal joint comprising two joint members having each a body portion carrying two oppositely arranged truncated cones having a common axis passing through and normal with the axis of the body portion, and a rib connecting the two truncated cones the truncated cones of one joint member peripherally contacting with the truncated cones of the other joint member, and intercrossed pins passing through the axes of the respective truncated cones and connecting the two joint members for universal movement.

6. A universal joint comprising two joint members having each a body portion, carrying two oppositely arranged truncated cones having a common axis passing through and normal with the axis of the body portion and a spherical base, a cone-connecting rib and spherically recessed spaces intermediate the said truncated cones, the truncated cones of one joint member peripherally contacting with the truncated cones of the other joint member and entering with their base portions into the recessed spaces thereof and intercrossed pins passing through the axes of the respective truncated cones and connecting the two joint members for universal movement.

In testimony whereof I affix my signature in presence of two witnesses.

FERDINAND FISCHER.

Witnesses:
  HUBERT P. WERTHEIMER,
  MARG. ZOPF.